United States Patent [19]
Dillon et al.

[11] Patent Number: 6,126,874
[45] Date of Patent: *Oct. 3, 2000

[54] PROCESS OF MAKING A GRAPHITIZABLE FOAM PREFORM

[75] Inventors: Frank Dillon; Charles A. Parker, both of Granger, Ind.; Richard R. McCormick, Tucson, Ariz.; Jonathon K. Chatwood, Tucson, Ariz.; Mark Rigali, Tucson, Ariz.

[73] Assignee: AlliedSignal Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/112,993

[22] Filed: Jul. 10, 1998

Related U.S. Application Data

[63] Continuation-in-part of application No. 08/970,558, Nov. 14, 1997
[60] Provisional application No. 60/086,426, May 22, 1998.

[51] Int. Cl.[7] .............................. B29C 44/02; C01B 31/04
[52] U.S. Cl. .............................. 264/29.7; 264/42; 264/53; 264/140
[58] Field of Search .............................. 264/29.7, 42, 53, 264/140

[56] References Cited

U.S. PATENT DOCUMENTS

| | | | |
|---|---|---|---|
| 3,663,171 | 5/1972 | Granger | 23/209 |
| 3,937,775 | 2/1976 | Horikiri | 264/29 |
| 4,276,246 | 6/1981 | Bonzom et al. | 264/53 |
| 4,537,823 | 8/1985 | Tsang et al. | 428/308.4 |
| 4,605,595 | 8/1986 | Tsang et al. | 428/413 |
| 4,832,870 | 5/1989 | Clough | 252/511 |
| 4,891,203 | 1/1990 | Singer et al. | 423/449 |
| 4,975,261 | 12/1990 | Takabatake | 423/445 |
| 4,986,943 | 1/1991 | Sheaffer et al. | 264/29.1 |
| 5,015,522 | 5/1991 | McCuliough et al. | 428/312.2 |
| 5,071,631 | 12/1991 | Takabatake | 423/445 |
| 5,300,272 | 4/1994 | Simandi et al. | 423/445 |
| 5,547,737 | 8/1996 | Evans et al. | 428/178 |
| 5,744,075 | 4/1998 | Klett et al. | 264/29.7 X |
| 5,744,510 | 4/1998 | Pekala | 521/181 |
| 5,770,127 | 6/1998 | Abrams et al. | 264/29.1 |
| 5,789,338 | 8/1998 | Kaschmitter et al. | 502/418 |
| 5,868,974 | 2/1999 | Kearns | 264/29.6 |

FOREIGN PATENT DOCUMENTS 562 591   9/1993   European Pat. Off. .

OTHER PUBLICATIONS

R. Metha, et al.: "Graphitic carbon foams: Processing and characterization" 1993, American Carbon Society XP002061088 pp. 104 & 105.

"Idustry Outlook"; Aviation Week & Space Technology, p. 13/Nov. 13, 1995.

Ultramet Engineered Materials Solutions brochure, 3 pages / Mar., 1992.

ULTRAFOAM "Open–Cell Silicon Carbide Foam" data, Ultramet, Nov. 14, 1995.

Ceramic Bulletin, Vol. 70, No. 6, 1991, pp. 1025–1027: "Refractory Ceramic Foams: A Novel, New High–Temperature Structure".

Patent Abstracts of Japan vol. 013, No. 339 (C–624) 31 July 1989 (1989–07–31) & JP 01 115882 A (Sumitomo Metal Ind. Ltd.), 9 May 1989 (1989–05–09) abstract.

Patent Abstracts of Japan vol. 019, No. 505, 30 June 1995 (1995–06–30) & JP 07 033551 A (Nippon Steel Chem. Co., Ltd.), 3 February 1995 (1995–02–03) abstract.

Chemical Abstracts, vol. 117, No. 12, 21 September 1992 (1992–09–02) Columbus, Ohio, US; abstract no. 117129z, Y. He et al. "Foamed graphit–ceramic refractory composites" XP000373810 abstract & CN 1 056 892 A 11 December 1991 (1991–12–11).

*Primary Examiner*—Leo B. Tentoni
*Attorney, Agent, or Firm*—Larry J. Palguta

[57] ABSTRACT

The present invention provides an inexpensive, open cell, mechanically robust and graphitizable foam preform. The graphitizable foam is produced via a modified standard flower foam formulation. The invention provides a modified formula for such flower foams wherein a mesophase material is incorporated along with a corresponding reduction in the resole component. The mesophase material replaces 30–70% by weight (a target of 50% by weight) of the resole component of the formulation. The formulation is heated to effect foaming of the mixture, and then carbonized to produce an open cell, graphitizable foam preform.

12 Claims, 2 Drawing Sheets

PROCESS OF MAKING A GRAPHITIZABLE FOAM PREFORM

This patent application claims priority upon U.S. provisional patent application Ser. No. 60/086,426, filed May 22, 1998.

This is a continuation-in-part of U.S. patent application Ser. No. 08/970,558, filed Nov. 14, 1997.

The present invention relates generally to the production of a graphitizable foam material, and in particular to a graphitizable foam preform that may be subsequently densified to provide a friction material.

BACKGROUND OF THE INVENTION

Carbon-carbon composites are widely used for aircraft brake friction materials. Carbon-carbon is attractive because it is lightweight and can operate at very high temperatures, and because it can, pound for pound, absorb a great deal of aircraft energy and convert it to heat. A major drawback with the use of carbon-carbon for this application is the high cost of raw material used to make the parts. Expensive carbon fiber is a significant component; sometimes up to 45% fiber is used in the composite. Fiber costs can often be the single largest contributor to the cost of making a friction material. Another drawback is that the manufacture of carbon-carbon is a time-consuming process. The overall process for making a carbon brake disk is measured in weeks, and even months. Long cycle times are undesirable in a modern manufacturing environment. It is highly desirable to provide a process that has a reduced cost and shortened cycle time for making a carbon-carbon composite.

The invention disclosed herein addresses the major drawbacks of manufacturing carbon-carbon composites: cost and cycle time. These drawbacks have been identified and discussed in the parent U.S. patent application Ser. No. 08/970,558, filed on Nov. 14, 1997, and incorporated by reference herein. One way of overcoming these drawbacks to manufacturing carbon-carbon composites is to replace the fiber preform with a graphitizable foam that would result in significantly lowered manufacturing and processing costs. The foam preform should have predominantly and uniformly open cells to allow for the subsequent densification of the foam preform. The foam preform should have the necessary mechanical integrity and be physically robust for ease of handling during subsequent processing. The thermo mechanical properties (e.g. thermal conductivity/diffusivity) of a carbon-fiber preform can be attained by a foam preform only if it is graphitized. Therefore, the foam preform must be graphitizable. If these requisite properties are accomplished, a further benefit can be attained with the use of a graphitizable foam preform as opposed to a carbon-fiber preform. A graphitizable foam preform will have the requisite physical and thermo-mechanical isotropy. Carbon-fiber preforms (made from both random fiber and non-woven methods) are profoundly anisotropic in that properties such as thermal conductivity vary according to the orientation of the fibers. The graphitizable foam preform, which does not include fibers, reduces the degree of bulk anisotropy and would be very useful in the development of carbon-carbon composite discs for applications such as friction discs in aircraft brakes.

SUMMARY OF THE INVENTION

Briefly, the present invention comprises a process utilizing a thermoset resin with a thermoplastic additive and a physical blowing agent to provide a graphitizable foam preform, comprising the steps of providing a mixture of a resole phenolic, one of a ground pitch and synthetic pitch, surfactant, catalyst and blowing agent;

(a) heating the mixture to above 50° C. in order to effect foaming of the mixture to provide a foam preform, and (b) heating the foam preform to a temperature within the range of 600–2000° C. to produce an open cell, graphitizable foam preform.

BRIEF DESCRIPTION OF THE DRAWINGS

FIG. 1b is a representation of a portion of the graph of FIG. 1a;

Figure 1A:
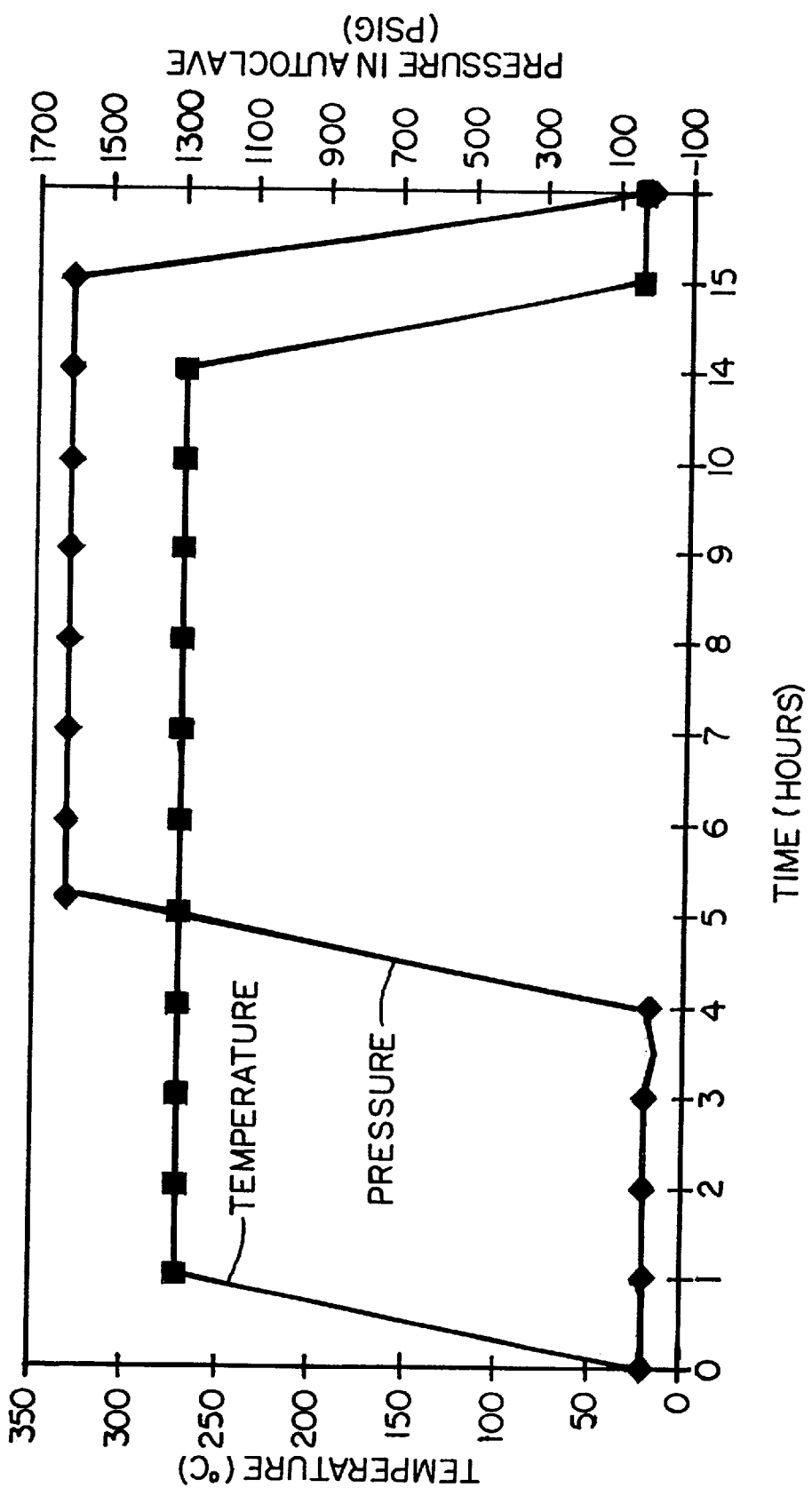
FIG. 1a is a graphic representation of the vacuum impregnation cycle use for densifying foams in accordance with the present invention.

The present invention provides an inexpensive, open cell, mechanically robust and graphitizable foam preform. The graphitizable foam is produced via a modified standard flower foam formulation. Flower foams are resole phenolic-based foams used to mount or hold flowers in a dry or aqueous environment. The present invention comprises a modified formula for such flower foams wherein a mesophase material is incorporated along with a corresponding reduction in the resole component. The mesophase material replaces 30–70% by weight (a target of 50% by weight) of the resole component of the formulation. The formulation of a flower foam and its modification to include a mesophase component are both listed below in Chart A.

Chart A

| Material | Flower Foam (wt. %) | Graphitizable Foam (wt. %) Target | Graphitizable Foam (wt. %) Range |
|---|---|---|---|
| Resole Phenolic (e.g. HRJ 11761) | 73.30 | 42.30 | (28.36–66.16) |
| Mesophase Pitch (e.g. AR24) | 0.00 | 42.30 | (28.36–66.16) |
| Surfactant (e.g. Tween 40 ®) | 0.73 | 0.40 | (0.1–1.0) |
| Catalyst Sol$^n$., QO ® FA-ROK® 6301 | 22.00 | 12.70 | (8.0–25.0) |
| Nucleation Additive, Cab-O-Sil ® | 0.37 | 0.23 | (0.00.5) |
| Blowing Agent, e.g. hexane/pentane (50/50 vol.) | 3.70 | 2.13 | (1.0–5.0) |

HRJ 11761 is a liquid phenolic resole resin produced by Schenectady International Inc.
Mesophase pitch AR24 is a synthetic naphthalene derived mesophase pitch supplied by Mitsubishi Gas Chemcal Company.
Tween 40 ® [polyoxyethylene (20) sorbitan monopalmitate is a surfactant supplied by Aldrich Chemical Company.
QO ® FA-ROK ® 6301 (phenosulfonic acid mixture) supplied by QO Chemicals, Oakbrook, Illinois, is a polymerization catalyst for the resole phenolic resin.
Cab-O-Sil ® is an amorphous fumed silica (grade M-5) supplied by Cabot Corporation.
The hydrocarbon solvent blowing agents used in above formulation (i.e. hexane/pentane) are readily available from many sources (there is no specific purity grade preferred).

The modified flower foam formulation is provided by mixing the components listed in Chart A at room temperature by using a high shear mixer for approximately two to three minutes. Although experimental work has included the nucleation-additive Cab-O-Sil®, it is believed that the function of the nucleation additive is duplicated by the mesophase pitch. The mixture is then charged into a mold and subsequently placed into a drying oven at 73° C.±5° C. The mixture begins foaming within one to two minutes, and after a further ten to fifteen minutes the mixture will expand five to tenfold in volume. For all intents and purposes, the foam is 'thermoset' after this stage and can be carbonized (heated) by conventional methods to produce an open cell, graphitizable foam.

To ensure a homogenous microstructure and uniform foam morphology, it is essential that the mesophase pitch (in this case, Mitsubishi AR24) is ground to −325 mesh before mixing. The mesophase particles are then more evenly distributed throughout the foam struts and nodes. There appears to be an added benefit associated with the mesophase particles in that they disrupt the development of a uniform cell wall membrane. The graphitizable foam formulation is designed specifically to discourage the formation of cell walls and by the use of an appropriate amount of surfactant and mesophase pitch particles this goal is achieved. It should be clearly understood that the component of the foam that imparts graphitizability (mesophase pitch) can be replaced with other graphitizable carbon precursors such as coal-tar, petroleum or synthetic pitches. Additionally, the above method of producing foam can be replaced by the use of conventional foam extrusion technology.

After the graphitizable foam preform has been created by expansion of the foam material, the foam preform can be carbonized by any one of carbonization processes well known to those skilled in the art. Carbonization can be carried out in the range of as low as 600° C. and up to 2000° C. in order to remove volatiles and so on from the structure. Carbonization may then be followed by heat treatment if it is desired to modify the mechanical, thermal and chemical properties of the carbon in the struts of the foam preform. The foam preform may be heat treated in the range of 1600° C. to 2800° C. The effect of such a treatment on graphitizable materials is well known. Higher temperatures increase the degree of order in the material, increase the thermal conductivity of the carbon in the struts, and increase the elastic modulus. However, higher temperatures may also tend to decrease the strength somewhat. Finally, the carbonized foam preform may be densified by any method for densifying a carbon preform as well known to those experienced in the fabrication of carbon-carbon composites. The most obvious techniques are chemical vapor deposition (CVD) of carbon, also known as chemical vapor infiltration (CVI), and pitch impregnation followed by carbonization. A combination of those techniques may also be used. Multiple cycles of densification are almost always required. After densification, an intermediate or final heat treatment of the preform is usually applied to modify the crystal structure and order of the carbon. This process is typically very similar to the heat treatment of the foam, described above. And finally, the material is machined to the usable shape of a friction material or other structural component. An oxidation protection coating or treatment can be applied if desired. There are many potential uses for articles made from the graphitizable foam of the present invention. For example, substrates for catalysts, high temperature insulation/dampers, filters and substrates for/or conversion to SiC. One of the advantages provided by the present invention is the ease of processing and handling the graphitizable foam preform. The graphitizable foam preform does not have to be kept at a warm temperature to avoid brittlization, and has sufficient robustness for handling during processing. Additionally, all of the components (with the exception of mesophase pitch) are commonly used industrial materials with no significant health and safety concerns. The graphitizable foam of the present invention enables the rapid and low cost production of complex carbon-carbon composite parts.

Figure 1B:
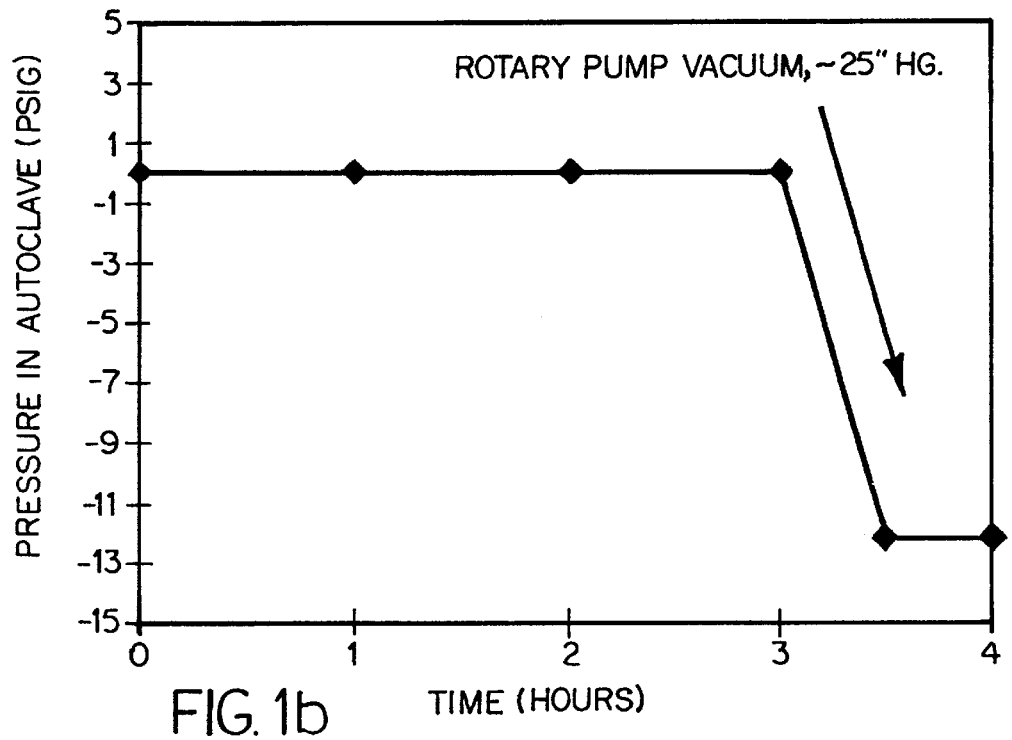

A graphitizable foam preform was densified in a repeated vacuum/pressure impregnation and pressurized carbonization cycle. This type of densification cycle is common and known to those practiced in the art. A schematic or graphic representation of the vacuum/pressure impregnation procedure is shown in FIG. 1a. FIG. 1b is an enlarged illustration of the vacuum which is applied during the impregnation procedure. Subsequent to the vacuum/pressure impregnation stage the impregnated hybrid foam is carbonized up to 600° C. under pressure in an autoclave. A typical cycle is as follows: from room temperature (25° C.) to 600° C. in 4 hours, a 2 hour soak at 600° C. and cool down from 600° C. to room temp in $\geq$4 hours. Prior to heating the vessel is pressurized to 700 psig with nitrogen gas. The pressure vessel is fitted with a pressure relief valve set at 2000 psig. The pressure rise during carbonization is due initially to a rise in temperature of the nitrogen gas but with increased temperature (>120° C.) volatiles such as water and low molecular weight hydrocarbons are evolved from the pitch and contribute to the pressure increase. Volatile evolution continues throughout the carbonization process (particularly between 300° C. and 500° C.) such that the pressure of the vessel is maintained at 2000 psig during the soak period at 600° C. It is this imposition of pressure during carbonization that increases the carbon yield from pitch impregnants such as 15-V coal tar pitch. The pressurized carbonization cycle partially carbonizes the densified hybrid foam sample. To fully carbonize the sample it undergoes a further char or calcination step to 1050° C. at atmospheric pressure. At this stage the impregnated hybrid foam sample is fully carbonized, and it can be further densified as is or heat-treated (graphitized) before repeating the densification process.

Figure 2:
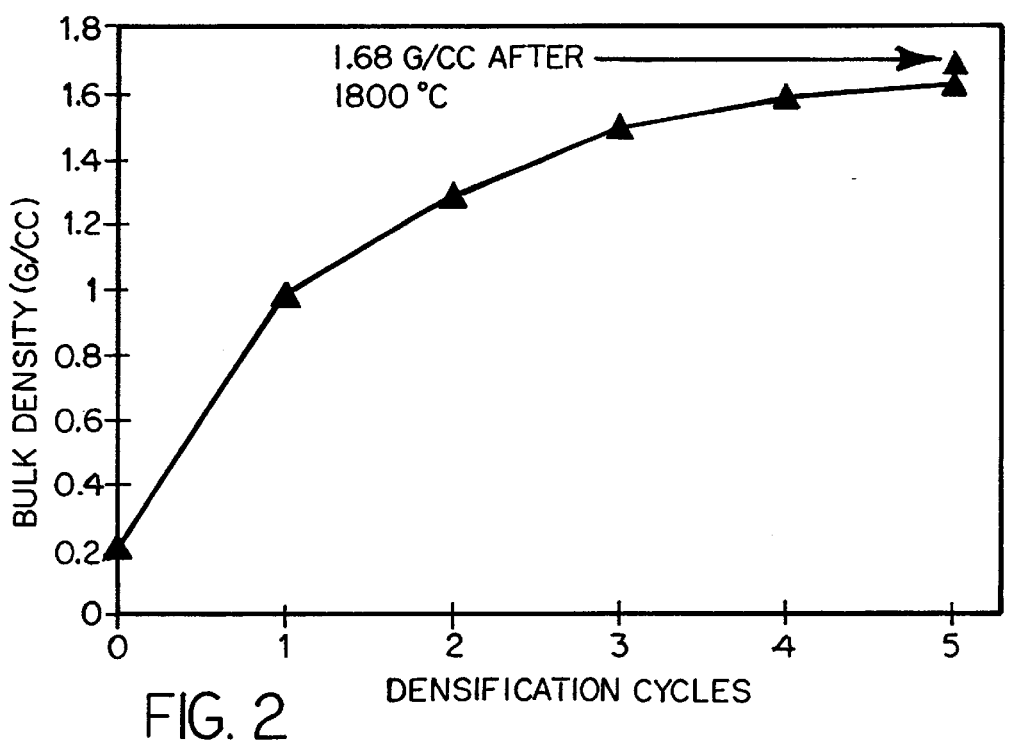
FIG. 2 is a graph of the density of the impregnated foams

FIG. 2 shows an example of the densification profile of a graphitizable foam friction material used to produce test specimens for a brake dynamometer. The friction material was tested using a standard 220 stop test sequence. The densified foam friction material had a density of 1.68 g/cc, an average friction coefficient of 0.346 after 220 stops and a wear rate of 0.3608 mg/s/s (miligrams/surfacelstop) over a friction area of 14.7 square centimeters.

We claim:

1. A process utilizing a thermoset resin with a thermoplastic additive and a physical blowing agent to provide a graphitizable foam preform, comprising the steps of providing a mixture of a resole phenolic, ground mesophase pitch, surfactant, catalyst and blowing agent;
    (a) heating the mixture to above 50° C. in order to effect foaming of the mixture to provide a foam preform, and
    (b) heating the foam preform to a temperature within the range of 600–2000° C. to produce an open cell, graphitizable foam preform.

2. The method in accordance with claim 1, wherein the resole phenolic has a weight percentage within the range of approximately 28–66%, and the mesophase pitch has a weight percentage within the range of approximately 28–66%.

3. The method in accordance with claim 2, wherein the mesophase pitch was ground to at least −325 mesh prior to mixing.

4. The method in accordance with claim 1, wherein the catalyst is within the range of approximately 8–25% by weight.

5. The method in accordance with claim 1, further comprising the step of heat treating the preform within the temperature range of approximately 1600° C. to 2800° C.

6. The method in accordance with claim 1, wherein the mixture includes a nucleation additive.

7. A process utilizing a thermoset resin with a thermoplastic additive and a physical blowing agent to provide a graphitizable foam preform, comprising the steps of providing a mixture of a resole phenolic, one of a ground pitch and synthetic pitch; surfactant; catalyst and blowing agent;
   (a) heating the mixture to above 50° C. in order to effect foaming of the mixture to provide a foam preform, and
   (b) heating the foam preform to a temperature within the range of 600–2000° C. to produce an open cell, graphitizable foam preform.

8. The method in accordance with claim 7, wherein the resole phenolic has a weight percentage within the range of approximately 28–66%, and the pitch has a weight percentage within the range of approximately 28–66%.

9. The method in accordance with claim 8, wherein the pitch was ground to at least −325 mesh prior to mixing.

10. The method in accordance with claim 7, wherein the catalyst is within the range of approximately 8–25% by weight.

11. The method in accordance with claim 7, further comprising the step of heat treating the preform within the temperature range of approximately 1600° C. to 2800° C.

12. The method in accordance with claim 7, wherein the mixture includes a nucleation additive.

* * * * *